INVENTOR.
E. P. ROEDERER JR.

BY

ATTORNEYS

Aug. 30, 1960     E. P. ROEDERER, JR     2,950,724

SAMPLING DEVICE AND METHOD FOR OBTAINING SAMPLES

Filed Jan. 20, 1956     4 Sheets-Sheet 4

INVENTOR.
E. P. ROEDERER JR.

BY Hudson and Young

ATTORNEYS

United States Patent Office 2,950,724
Patented Aug. 30, 1960

2,950,724

SAMPLING DEVICE AND METHOD FOR OBTAINING SAMPLES

Edward P. Roederer, Jr., Lafayette, La., assignor to Phillips Petroleum Company, a corporation of Delaware Filed Jan. 20, 1956, Ser. No. 560,356

8 Claims. (Cl. 134—183)

This invention relates to an improved sampling device and an improved method for obtaining samples. In one aspect, this invention relates to an improved sampling device for obtaining representative samples of cuttings from drilling operations. In another aspect this invention relates to an improved method for obtaining representative samples of cuttings from drilling operations.

In drilling oil, gas or other type wells, drilling fluid or mud is continuously circulated from the surface of the earth to the drilling area and back in order to cool and lubricate the drill bit, carry away the cuttings, and form an impervious coating on the walls of the drill hole. The drilling fluid or mud being returned from the drill hole is discharged onto a shale shaker which, broadly speaking, comprises a screen and means for agitating said screen. In the drilling of oil wells the shale shaker is usually mounted above the mud tank. The cuttings are retained on the screen and the mud flows therethrough into the mud tank and is recirculated. It is common practice to sample the cuttings so as to maintain a record of the formations being penetrated by the drill bit. It is important for the samples so collected to be representative samples, otherwise much reliable information will be lost. In the past, in many instances, such samples have been collected more or less irregularly by manually catching a sample of the cuttings as they are discharged from the screen of the shale shaker. Said cuttings were then manually washed to remove adhering drilling fluid and sacked for further investigation. Such methods introduce the human element to a large degree and for this reason are not reliable. Thus there is a definite need for a simple, reliable method and apparatus for obtaining a reliable representative sample. My invention provides such a method and apparatus.

An object of this invention is to provide an improved sampling device. Another object of this invention is to provide an improved method for obtaining samples of cuttings from drilling operations. Another object of this invention is to provide an improved apparatus for obtaining cuttings from drilling operations. Another object of this invention is to provide an improved method and an improved apparatus for obtaining reliable representative samples of cuttings from the drilling of an oil well. Still another object of this invention is to provide an improved sample collector and washer. A further object of this invention is to provide an improved flow regulator for controlling the flow of cuttings into a sample collector and washer. Other aspects, objects and advantages of the invention will be apparent to those skilled in the art upon reading this disclosure.

Thus, according to the invention, there is provided an apparatus for sampling well cuttings which comprises, in combination, a container, means for receiving cuttings from a well; means for moving said cuttings from said receiving means into said container; flow regulating means for controlling the amount of said cuttings flowing into said container; and means for washing the cuttings collected in said container.

Further, according to the invention, there is provided an improved method for obtaining and washing samples of cuttings from the drilling of a well, which method comprises the steps of: continuously separating said cuttings from a circulating stream of drilling fluid; passing said cuttings at a controlled rate into a container; and simultaneously washing said cuttings in said container so as to remove adhering drilling fluid therefrom.

While the method and apparatus of the invention can be employed in other drilling operations they are especially suited for the drilling of oil wells. For this reason the invention will be further described as employed in connection with the drilling of oil wells.

Figure 1:
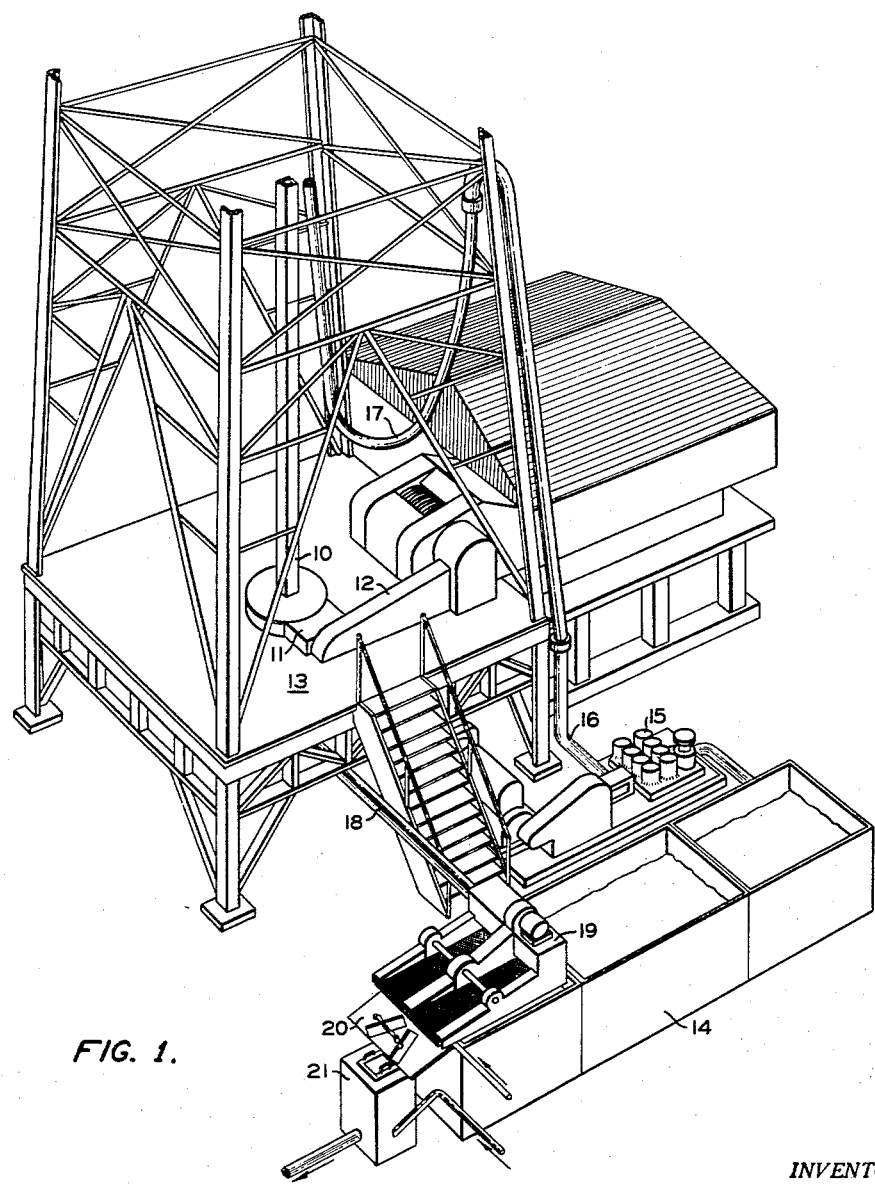
Figure 1 is an overall perspective view showing the relation of the apparatus of the invention to a mud tank and other conventional facilities at a well drilling site.

Referring now to the drawings, the invention will be more fully explained. In Figure 1, there is shown a kelly 10 which is rotated by a rotary table 11, driven by a power takeoff 12, from the draw works, the whole structure being supported by a derrick floor 13. Said kelly 10 is supported by a traveling block suspended from the top of said derrick, not shown. During drilling operations, drilling mud is circulated from mud tank 14 by means of pump 15 through conduit 16, and flexible hose 17 down the center of the drill stem and back to the surface of the earth around said drill stem. The returning mud is discharged from the drill hole into conduit 18 which discharges into shale shaker 19. Said shale shaker separates cuttings of the formation being drilled from the drilling mud, which drilling mud is returned to tank 14 for recirculation as described. Cuttings from shale shaker 19 pass through a flow regulator 20, fabricated in accordance with the invention, and into the collector and washer apparatus 21 of the invention. Said flow regulator 20 and washer and collector apparatus 21 will be further described hereinafter.

Figure 2:
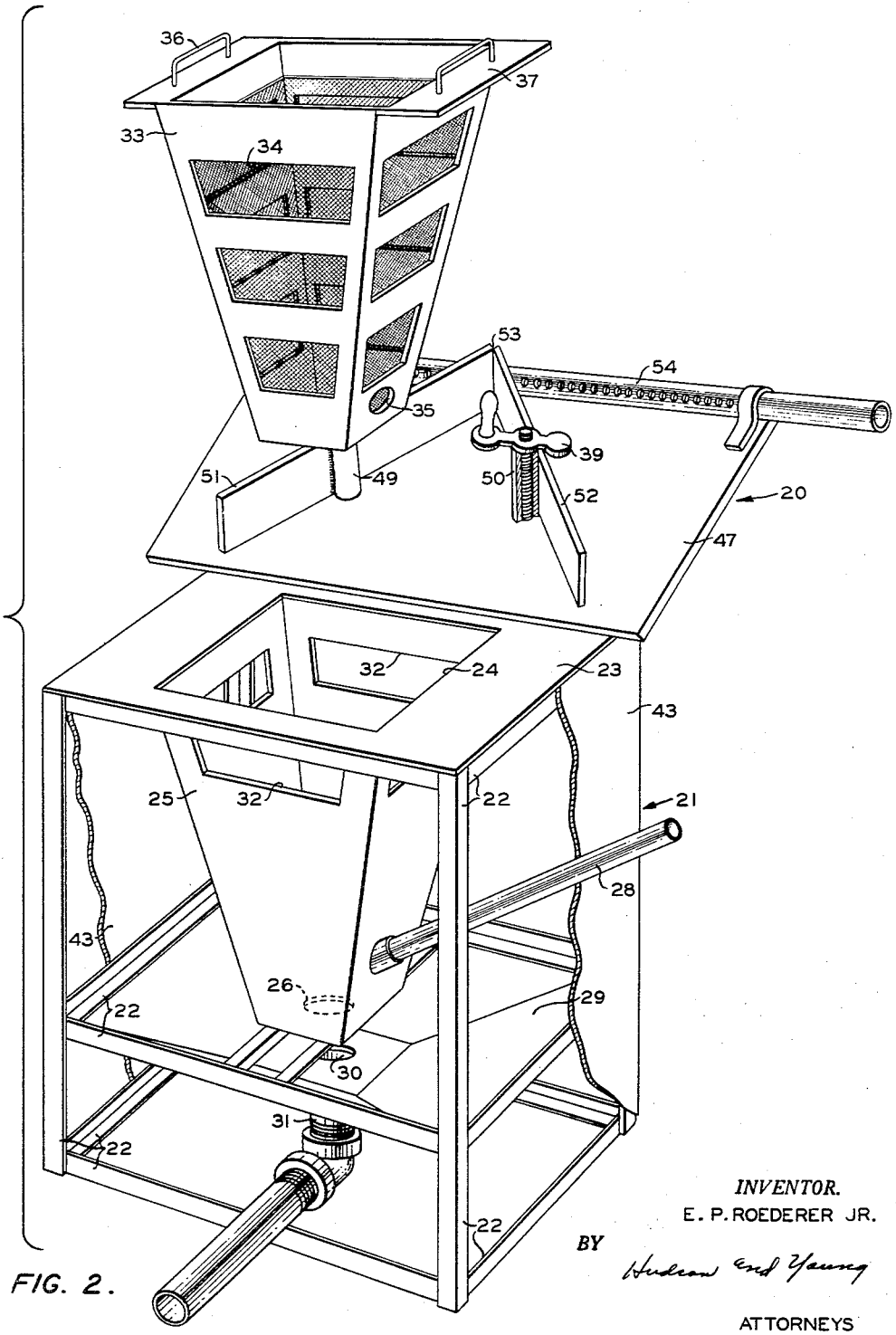
Figure 2 is a perspective view, partly in section, showing a presently preferred embodiment of a combination of apparatus according to the invention.

Figure 2 illustrates a presently preferred combination of the apparatus of the invention. It will be evident upon reading this disclosure that the sample collecting and washing device, denoted generally by the reference numeral 21, comprises one sub-combination of the invention and the flow regulating apparatus denoted generally by the reference numeral 20 comprises another sub-combination of the apparatus of the invention. Sample collector and washer 21 comprises a framework of horizontal and vertical members 22. Side cover plates 43 can be provided for said framework if desired. Said framework can be fabricated from any suitable material. As shown, said framework is fabricated from angle irons. While not shown in the drawing, it will be understood that said framework can be assembled by any suitable means such as by the use of bolts or by welding. However, due to the rough treatment which such apparatus usually receives, welding is usually preferred.

A rectangular top cover plate 23 is attached to and covers the top of said framework 22. Said cover plate has a rectangular opening 24 therein. A tapered housing 25, having a rectangular open top of the same configuration as said opening 24 in plate 23, is attached at its top edges to the edges of said opening 24. It will be noted that said housing 25 has a rectangular bottom smaller than its rectangular open top and the sides thereof taper downwardly from said top to said bottom. A drain 26 closed by plug 27 (Figure 3) is provided in the center of the bottom of said housing. An inlet conduit 28 extends into the lower portion of said housing. Disposed below said housing 25 and attached to said framework 22 is an overflow collecting pan 29. The sides of said pan slope inwardly from its outer edges to a rectangular shaped bottom having a drain 30 therein. An outlet conduit 31 is attached to said drain 30 and extends without said framework. While said collecting pan has been shown as comprising four sides which slope downwardly and inwardly to a rectangular bottom, it will be understood that a conical collecting pan, or other shaped pan can be used. Housing 25 is provided with openings 32 in the upper portion of each side thereof.

A tapered basket 33 having a rectangular open top and a rectangular bottom is adapted to be inserted into said housing 25. Said basket is provided with a plurality of rectangular openings 34 in each side thereof. An opening 35 is provided near the bottom on one side of said basket, and is adapted to cooperate with inlet conduit 28. The interior of said basket is lined with a suitable screen as shown. Said screen lining can cover all the openings in the sides of the basket if desired. However, it is preferred to leave one opening uncovered on one side as shown so as to facilitate overflow of wash water as discussed hereinafter. Handles 36 attached to lip plates 37 are provided for inserting and removing said basket from housing 25. Said lip plates rest on cover plate 23 and support said basket when it is in position in housing 25.

Figure 3:
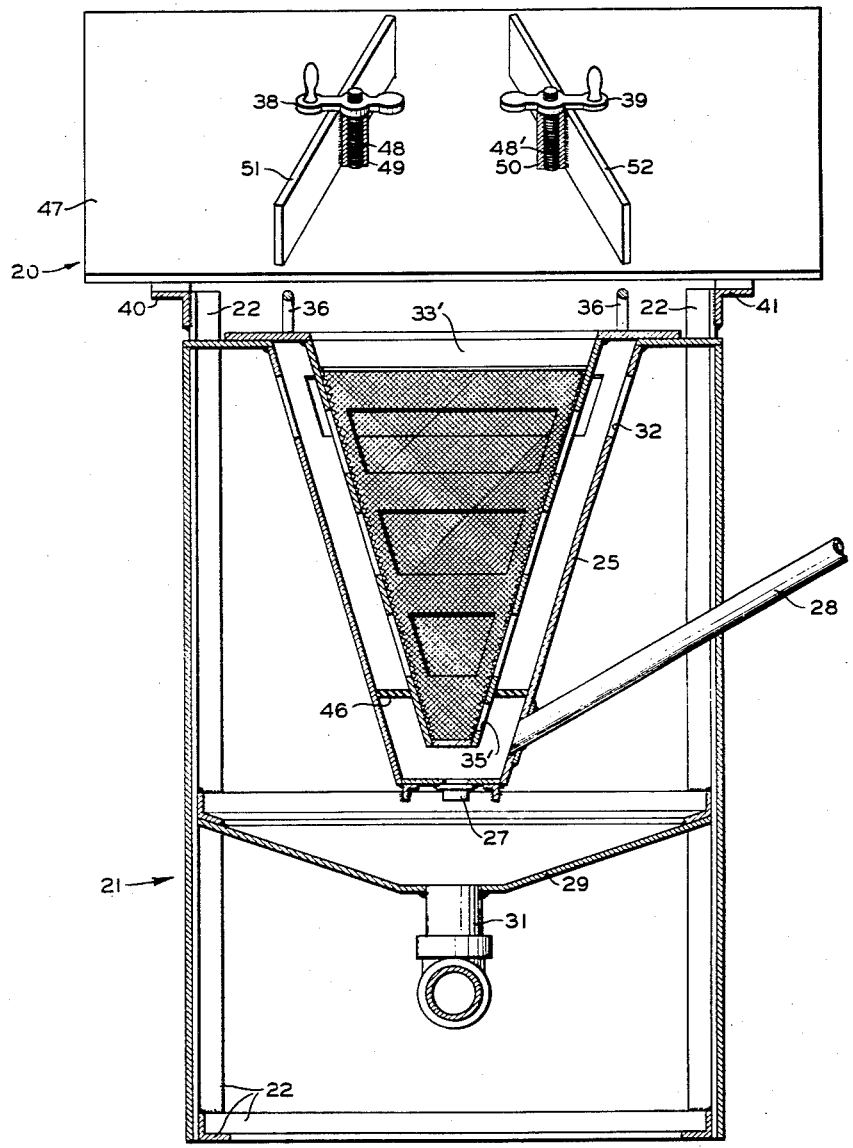
Figure 3 is a front elevation view, partly in section, of another combination of apparatus according to the invention.

The apparatus shown in Figure 3 is like that shown in Figure 2 except that a smaller basket 33' is employed. In the preferred embodiment of the apparatus shown in Figure 2, basket 33 is adapted to "fit" into housing 25, i.e., the walls of said basket 33 adjoin the corresponding walls of housing 25. In the apparatus shown in Figure 3, the walls of basket 33' are spaced apart from the corresponding walls of housing 25 and a rubber baffle plate 46 is inserted between the walls of said basket and the walls of said housing. Said rubber baffle plate extends in a horizontal direction from each wall of said basket to each corresponding wall of said housing. The water which is introduced into housing 25 by means of inlet conduit 28 is thus forced into the interior of basket 33' through opening 35' and serves to mix and wash the cutting sample as described further hereinafter.

Rubber baffle member 46 comprises a rectangular piece of sheet rubber having a rectangular opening in the center thereof. The outer dimensions of said baffle member, and the dimensions of the opening therein, are chosen so that in assembling said baffle member can be positioned on basket 33' prior to inserting the basket in housing 25. When said basket is inserted in said housing the baffle member will extend from each wall of the basket to each corresponding wall of the housing.

In both Figures 2 and 3, a table 47, inclined with respect to the vertical, is positioned above and to one side of the sample catcher and washer 21. The lower edge of said table is adjacent to rectangular opening 24 in said top cover plate 23. A pair of threaded pins 48 and 48' are attached to the surface of said table, as by welding, and extend upward perpendicular to said surface. Preferably said pins are mounted symmetrically on said surface with respect to the edges of the table. A first sleeve 49 and a second sleeve 50 are rotatably mounted upon said pins 48 and 48' respectively. A first baffle plate 51 is attached to said first sleeve 49 and a second baffle plate 52 is attached to said second sleeve 50. Threaded cranks 38 and 39 are provided for said first and second threaded pins respectively and are adapted when tightened to engage said sleeves 49 and 50 so as to hold said sleeves in predetermined position. Baffle plates 51 and 52 are adapted to be brought together at corresponding ends thereof as at 53 by means of rotation of said sleeves 49 and 50. In Figure 2, said baffle plates are shown as closed and no cuttings will be collected in the sample collector. In Figure 3, said baffle plates are shown in open position for the admission of cuttings into the sample catcher. Another of the various positions which said baffle plates can occupy is illustrated by the dotted lines in the plan view of Figure 4. A perforated pipe 54 is mounted upon and extends across the top of said table 47 in a horizontal direction. Said pipe has been omitted from Figure 3.

Table 47 can be attached to framework 22 either by welding or by bolts. Said table is supported by two angle irons 40 and 41 attached thereto. In Figure 3 said angle irons are shown as welded to the vertically extended ends of the back vertical members of framework 22.

Figure 4:
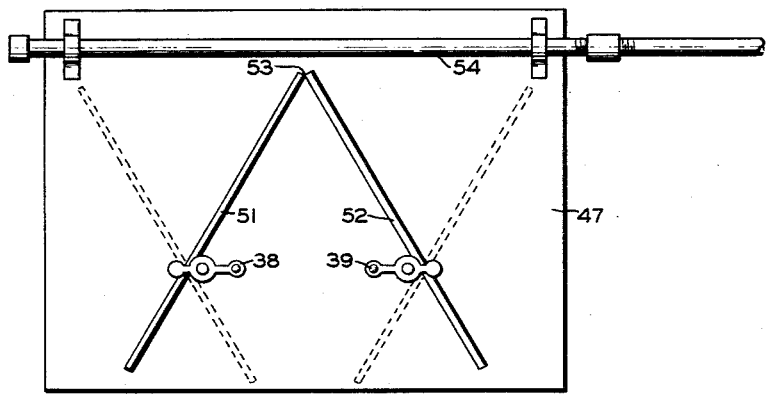
Figure 4 is a plan view of a subcombination of the apparatus of the invention, i.e., a presently preferred flow regulator.
Figure 5:
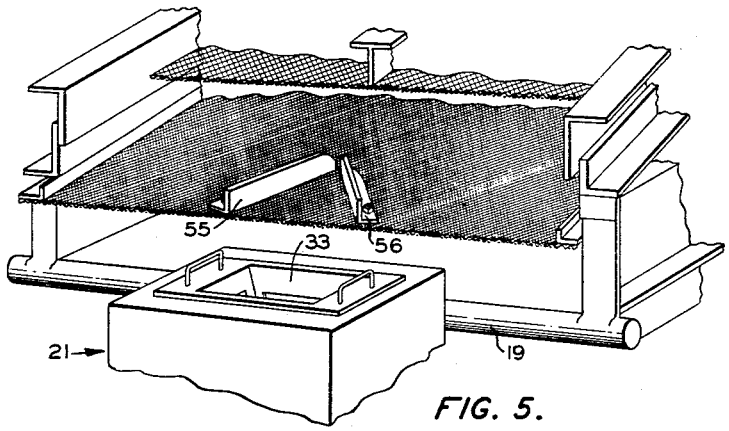
Figure 5 is a perspective view showing the relation of another flow regulator to the sample catcher and washer of the invention.
Figure 6:
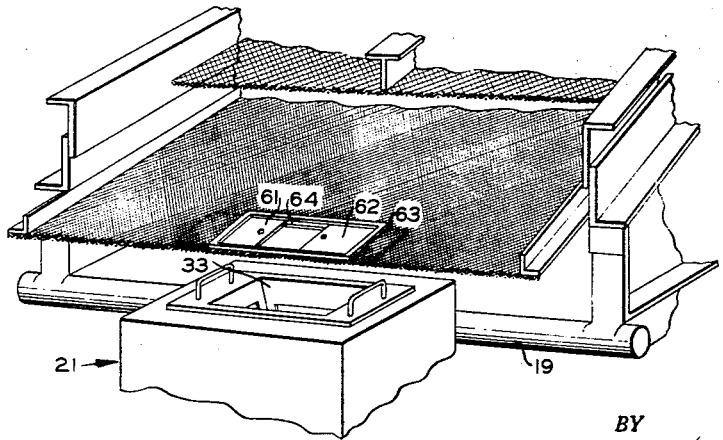
Figure 6 is a perspective view showing the relation of yet another flow regulator to the sample catcher and washer of the invention.

In Figures 5 and 6, there are illustrated alternative forms of regulating apparatus which can be employed to control the amount of cuttings sample flowing to the sample catcher. The apparatus of Figure 5 comprises a pair of angle iron baffle plates 55 and 56, similar to the baffle plates 51 and 52 of Figures 2, 3 and 4, mounted upon the extended discharge end of a screen of an otherwise conventional shale shaker. Said baffle plates 55 and 56 are rotatably attached to said shale shaker screen by means of bolts extending therethrough and are held in the desired position by tightening suitable nuts on said bolts.

The flow regulator mechanism illustrated in Figure 6 comprises a pair of sliding closure plates 61 and 62 mounted within a channel 64 attached to the edges of an opening 63 in an extended discharge end of the screen of an otherwise conventional shale shaker. The amount of cuttings sample flowing into sample catcher 21 is regulated by opening and closing said plates 61 and 62. Only one closer plate can be employed if desired.

A conventional shale shaker ordinarily comprises a frame, at least one screen movably mounted within said frame, and a motor or other means mounted on said frame for agitating said screen. Such shale shakers and the operation thereof are well known to those skilled in the art and no further description is believed necessary here. Conventional shale shakers of the type employed with the apparatus of this invention are available commercially from the Hutchison Manufacturing Co. of Houston, Texas.

In operation, referring to Figures 1 and 2, the sample collector and washer 21, having flow regulator 20 attached thereto, is placed at the end of mud tank 14 below the discharge end of the screen of the shale shaker. The apparatus is preferably positioned so that cuttings from the shale shaker will strike the table 20 of the flow regulator at a point below perforated pipe 54 but above the point 53 where said regulating baffle plates 51 and 52 come together in closed position. Basket 33 is then inserted into housing 25 and a stream of water from inlet conduit 28 is started flowing upwardly through said basket, overflowing through opening 32, and out drain 30 and conduit 31. Sleeves 49 and 50 are then rotated so as to place baffle plates 51 and 52 at the desired position to admit cuttings into the sample catcher at the desired rate. Said cuttings fall into the upflowing stream of water in basket 33 and adhering drilling mud is washed from said cuttings.

It will be understood by those skilled in the art that the opening between baffle plates 51 and 52 controls the rate at which cuttings flow into the sample catcher and that said rate can be adjusted to fill said basket during any given interval of drilling operations. For example, if it is desired to catch a sample for every five feet of formation penetrated, obviously the rate of flow of cuttings into basket 33 will be greater than if it is desired to obtain a sample for, say, every twenty-five feet of formation penetrated by the drill bit.

As the cuttings fall from the shale shaker screen and strike the surface of table 47, they are washed across the table by means of streams of water from perforated pipe 54. Said streams of water from perforated pipe 54 provide an initial washing of the cuttings and prevent said cuttings from accumulating on the surface of table 47.

It is to be noted that in operation there are no moving parts in the apparatus of the invention. Once the baffle plates 51 and 52 have been adjusted and the basket 33 has been placed in housing 25, no source of power is required except flowing water. This is a distinct advantage because since there are no moving parts, the likelihood of the apparatus breaking down and needing repairs is practically eliminated. Since no power is required, the apparatus can be quickly installed, merely by placing in proper location adjacent the shale shaker and making only one water connection. The simplicity of the design of the apparatus is an outstanding advantage and its rugged construction adapts it for transportation from one drilling rig to another. For example, the flow regulating mechanism can be detached from the sample collector and washer 21, and the two pieces loaded onto a truck and readily transported over the public highways without interference with other traffic on said highways. If desired, and indeed in many instances, it is preferred to permanently attach the flow regulating device to the sample washing and collector and transport the entire assembly as one unit.

An advantage of the method of the invention is that the cuttings are dropped into an upwardly moving body of water. Said cuttings are thus flowing countercurrently to said water and the upward flow of the water creates turbulence in the cuttings, thereby promoting thorough mixing. By proper regulation of the water admitted through inlet conduit 28, it is possible to maintain substantially the entire sample collected within basket 33 in a semi-fluidized or turbulent condition, without carrying any appreciable portion of the sample out through the openings 32 and 32'. By thus contacting and washing the cuttings, the adhered drilling fluid is removed from said cuttings and the basket 33 by flotation. The result is a well cleaned and well mixed sample of cuttings.

While the baskets 33 and 33' have been illustrated as having a plurality of rectangular openings in each side thereof, it is to be understood that other types of baskets can be employed. For example, a perforated basket, either lined or unlined, depending upon the size of the perforations, can be employed. Or for that matter, a wire basket can be employed. Said basket and its corresponding housing can be cylindrical instead of tapered and rectilinear as illustrated. However, the illustrated tapered rectilinear basket is preferred, because, a tapered basket is easier to insert and remove from the housing, i.e., the possibility of "fines" sliding between the wall of the basket and the housing, and causing said basket to become stuck is removed. Also, the tapered basket promotes better washing and mixing without carry over of cuttings due to the decrease in the velocity of the water from the bottom of the basket to the top of the basket.

While three types of flow regulating mechanisms have been illustrated, it is to be understood that they are by no means equivalent. The type of flow regulator illustrated in Figures 2, 3 and 4 is definitely the preferred type. Said flow regulator is positive in action and easy to operate. Furthermore, an elongated screen is not required for the shale shaker as is required when the flow regulator of Figures 5 and 6 are employed.

As will be evident to those skilled in the art, in view of the above discussion and disclosure, various other modifications of the invention can be made and carried out without departing from the spirit or scope of said invention.

I claim:

1. Apparatus for sampling well cuttings which comprises, in combination: a perforate container; a housing for said container, said housing being open at the top for receiving said container and having an opening in the upper portion of at least one side thereof; a framework for supporting said housing; a table, inclined with respect to the vertical, and positioned above and to one side of said housing, for receiving cuttings from a well, the lower edge of said table being adjacent said open top of said housing; a perforate pipe disposed across the top of said table in a horizontal direction; a flow regulator mounted on the surface of said table between said pipe and the lower edge of said table; and a wash liquid inlet conduit connected to the lower portion of said housing.

2. Apparatus according to claim 1 wherein: a top cover plate is mounted on said framework; said housing is attached to the sides of and extends downwardly from an opening in said top cover plate; an overflow collecting pan is disposed within and attached to said framework below said housing; and an outlet conduit is attached to a drain in the bottom of said pan and extends without said framework.

3. Apparatus according to claim 2 wherein: said housing is integral with said top cover plate; and side cover plates are attached to said framework.

4. Apparatus according to claim 1 wherein said flow regulator comprises a pair of baffle plates rotatably mounted on said table.

5. In apparatus for sampling, collecting and washing well cuttings, a sample collecting and washing device comprising, in combination: a framework; a plate covering the top of said framework, said plate having an opening therein; a housing, open at the top thereof and having an opening in the upper portion of at least one side thereof, attached at its top edges to the edges of said opening in said plate and extending downwardly within said framework below said opening in said plate; a tapered basket for collecting and retaining said samples of the material to be sampled, said basket being adapted to be inserted into said housing with its walls adjoining corresponding walls of said housing; and a water inlet conduit attached to the lower portion of said housing and in direct communication with an opening provided in the lower portion of said basket.

6. Apparatus for sampling, collecting and washing well cuttings which comprises, in combination: a rectilinear framework; a rectangular plate attached to and covering the top of said framework, said plate having a rectangular opening therein; a tapered housing having a rectangular open top of the same configuration as said opening in said plate and a rectangular bottom smaller than said rectangular open top, said housing being attached at its top edges to the edges of said opening in said plate and extending downwardly within said framework below said opening in said plate; a tapered basket adapted to be inserted into said housing, said basket having a rectangular open top and a smaller rectangular bottom of the same configuration as said top and bottom of said housing, said basket having a plurality of openings in the sides thereof and being lined with screen; a water inlet conduit attached to the lower portion of said housing; an overflow collecting pan disposed within and attached to said framework below said housing, said pan sloping from its outer edges to a central drain; an outlet conduit attached to said drain and extending without same framework; and a cover plate for each side of said framework.

7. Apparatus for sampling, collecting and washing well cuttings which comprises, in combination: a rectilinear framework; a rectangular plate attached to and covering the top of said framework, said plate having a rectangular opening therein; a tapered housing having a rectangular open top of the same configuration as said opening in said plate and a rectangular bottom smaller than said rectangular open top, said housing being attached at its top edges to the edges of said opening in said plate and extending downwardly within said framework below said opening in said plate; a tapered basket adapted to be inserted into said housing, said basket having a rectangular open top and a smaller rectangular bottom of the same configuration as said top and bottom of said housing, said basket having a plurality of openings in the sides thereof and being lined with screen; a water inlet conduit attached to the lower portion of said housing; an overflow collecting pan disposed within and attached to said framework below said housing, said pan sloping from its outer edges to a central drain; an outlet conduit attached to said drain and extending without said framework; a cover plate for each side of said framework; a table, inclined with respect to the vertical positioned above and to one side of said housing, the lower edge of said table being adjacent the rectangular opening in said top rectangular plate, said table being supported by a pair of support members attached to said framework; a first and a second threaded pin attached to the surface of said table and extending upward therefrom perpendicular to said surface; a first and a second sleeve rotatably disposed on and surrounding said first and second pins respectively; a first baffle plate and a second baffle plate attached to said first and second sleeves respectively, said baffle plates being adapted to be brought together at corresponding ends thereof by rotation of said sleeves; and means on each of said threaded pins for holding said sleeves at predetermined positions.

8. A sample collecting and washing device comprising, in combination: a framework; a plate covering the top of said framework, said plate having an opening therein; a housing, open at the top thereof, attached at its top edges to the edges of said opening in said plate and extending downwardly within said framework below said opening in said plate; a basket for collecting and retaining said samples of the material to be sampled, said basket being adapted to be inserted into said housing with each wall thereof spaced apart from a corresponding wall of said housing; a water inlet conduit attached to the lower portion of said housing; and a baffle plate extending from each wall of said basket to each corresponding wall of said housing at a point near the bottom of said basket and said housing but above said water inlet.

References Cited in the file of this patent
UNITED STATES PATENTS

| | | | |
|---|---|---|---|
| 458,837 | Pike | Sept. 1, | 1891 |
| 528,974 | Pike | Nov. 13, | 1894 |
| 1,191,227 | Ramsay | July 18, | 1916 |
| 1,249,491 | Ramsay | Dec. 11, | 1917 |
| 1,299,698 | Fitzgerald | Apr. 8, | 1919 |
| 1,810,827 | Hatcher et al. | June 16, | 1931 |
| 2,164,258 | Schultz | June 27, | 1939 |
| 2,302,996 | Lilligren | Nov. 24, | 1942 |
| 2,369,582 | Lewis | Feb. 13, | 1945 |
| 2,423,651 | Jones | July 8, | 1947 |
| 2,576,283 | Chaney | Nov. 27, | 1951 |